United States Patent [19]

Fujisawa et al.

[11] Patent Number: 5,622,372
[45] Date of Patent: Apr. 22, 1997

[54] METAL SEAL RING AND A METHOD OF PRODUCING THE SAME

[75] Inventors: Katsuhide Fujisawa; Masakatsu Takahashi; Shuji Hoshino, all of Yamato, Japan

[73] Assignee: Nippon Reinz Co., Ltd., Kanagawa, Japan

[21] Appl. No.: 544,154

[22] Filed: Oct. 17, 1995

[51] Int. Cl.$^6$ ..................................................... F16J 15/10
[52] U.S. Cl. ..................... 277/235 R; 277/227; 277/229
[58] Field of Search ................................. 277/216, 223, 277/227, 229, 233, 234, 235 R

[56] References Cited

U.S. PATENT DOCUMENTS

| | | | |
|---|---|---|---|
| 1,838,496 | 12/1931 | Oven | 277/229 |
| 3,879,044 | 4/1975 | Estes | 277/227 |
| 4,280,709 | 7/1981 | Heikes, Jr. et al. | 277/227 |
| 5,269,540 | 12/1993 | Nobuchi et al. | 277/229 |
| 5,407,214 | 4/1995 | Lew et al. | 277/227 |

FOREIGN PATENT DOCUMENTS 2172347  9/1986  United Kingdom ................. 277/227

Primary Examiner—Daniel G. DePumpo
Attorney, Agent, or Firm—Koda and Androlia

[57] ABSTRACT

The present disclosure relates to a metal seal ring suitably used at pipe connection portions in exhaust pipe systems of automobile engines for example and a method of producing the same. The metal seal ring comprises a metal ring having a pipe-shaped cross section, and a heat-resistant composite gasket material ring filling the metal ring, wherein the composite gasket material ring is formed such that a sheet of the composite gasket material, such as a mixture of heat-resistant fiber and elastomer, a having reinforcing core material, such as a wire net and a perforated steel plate, therein, is slit to obtain a rectangular strip, that both longitudinal ends of the strip are joined to each other to form a ring, and that both fringes of the strip are butt-joined to each other to form a ring having a pipe-shaped cross section. A one-side opened metal ring having a U- or J-shaped cross section and two leg portions opened and extended nearly in parallel is filled with the composite gasket ring thus made, and then the two leg portions of the metal ring are bent so as to close the opening of the ring, thereby forming a closed pipe ring.

6 Claims, 5 Drawing Sheets

(PRIOR ART)
FIG. 10(a)  FIG. 10(b)
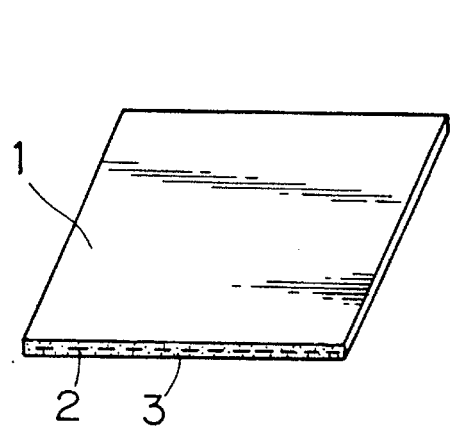
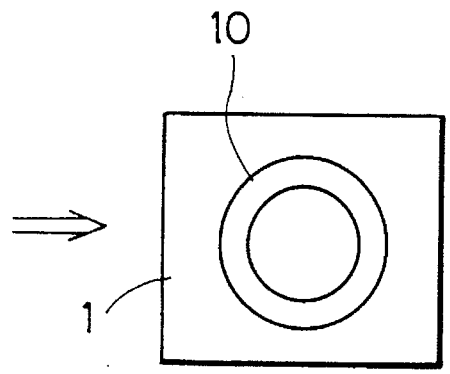
FIG. 10(c)
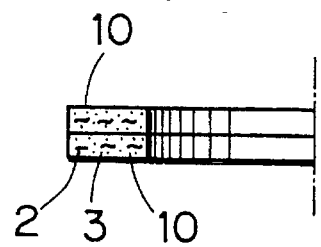
FIG. 10(d)  FIG. 10(e)
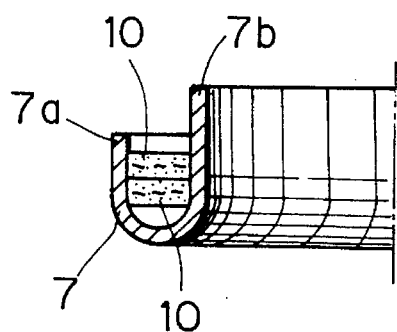
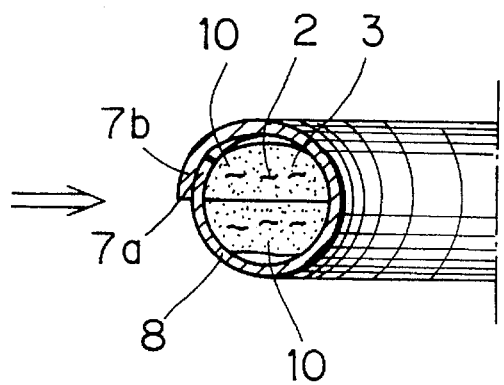

METAL SEAL RING AND A METHOD OF PRODUCING THE SAME

SPECIFICATION

TITLE OF THE INVENTION

A metal seal ring and a method of producing the same.

BACKGROUND OF THE INVENTION

1. Field of the Invention

The present invention relates to a metal seal ring suitably used at pipe connection portions in exhaust pipe systems of automobile internal combustion engines for example and a method of producing the same.

2. Prior Art

A metal seal ring comprising a metal ring having a pipe-shaped cross section filled with a heat-resistant composite gasket material is used to seal connection portions, such as the connection portion between the exhaust manifold and the exhaust pipe, and the pipe connection portion between the exhaust pipe and the catalytic converter or the muffler of an automobile engine.

Such a metal seal ring is produced by a method shown in FIG. 10, a view illustrating a production process. More specifically, a sheet 1 of a heat-resistant composite gasket material 3, such as graphite, having a reinforcing core material 2, such as a perforated steel plate, therein is first prepared (FIG. 10a). The sheet 1 is stamped into a ring plate 10 (FIG. 10b). A predetermined number of the ring plates 10, two ring plates for example, are overlaid with one another (FIG. 10c). A one-side opened metal ring 7 made of a metal sheet and having a J- or U-shaped cross section and two leg portions 7a and 7b opened and extended nearly in parallel (FIG. 10d) is filled with the overlaid ring plates 10. Next, the leg portions 7a and 7b of the one-side opened metal ring 7 are bent so as to close the open end of the metal ring 7, thereby forming a closed pipe ring 8 (FIG. 10e).

In the conventional metal seal ring produced by the above-mentioned production method, the composite gasket material 3 used to fill the metal ring 7 is obtained by stamping the sheet 1 into the ring plate 10. From the entire area of the sheet 1, the area to be stamped and used for the ring plate 10 is small and a large amount of stamping waste is generated. The utilization efficiency of the sheet 1 is thus low, causing the problems of a waste of material and high costs of products.

SUMMARY OF THE INVENTION

The present invention is intended to solve the above-mentioned problems. The objects of the present invention are to improve the structure of a metal seal ring and the method of producing the same so as to fully utilize the above-mentioned composite gasket material sheet without generating a large amount of stamping waste.

To achieve the above-mentioned objects, the metal seal ring of the present invention comprises a closed pipe ring made of a metal plate, and a ring of a composite gasket material having a reinforcing core material therein and filled in the closed pipe ring, wherein the ring of the composite gasket material is formed such that both longitudinal ends of a rectangular strip of the composite gasket material having the reinforcing core material therein are joined to each other and that the strip is bent to form a pipe ring shape by butt-joining both fringes of the strip to each other.

In addition, to achieve the above-mentioned objects, the metal seal ring of the present invention is produced by a method comprising: a step of filling a one-side opened metal ring made of a metal sheet and having two leg portions opened and extended nearly in parallel with a ring of a composite gasket material having a reinforcing core material, and a step of bending the leg portions to form a closed pipe ring, wherein the ring of the composite gasket material is formed such that first, a sheet of the composite gasket material having the reinforcing core material therein is slit into rectangular strips, each having predetermined width and length values; second, both longitudinal ends of the strip are joined to each other; and third, the strip is bent to form a pipe ring shape by butt-joining both fringes of the strip to each other.

A soft gasket material having heat resistance and elasticity, such as a mixture of heat-resistant fiber and elastomer, a graphite sheet, a ceramic sheet primarily made of ceramic fiber or a heat expansion ceramic sheet, laminated or coated on the reinforcing core material, such as a perforated steel plate, can be used as the composite gasket material having the reinforcing core material therein. Furthermore, the composite gasket material ring having a pipe-shaped cross section formed as described above may be compressed in the vertical direction to obtain a composite gasket material ring having a nearly solid circular cross section.

A metal ring having a U- or J-shaped cross section can be used as the above-mentioned one-side opened metal ring.

In accordance with the present invention, since a sheet of the composite gasket material having the reinforcing core material therein is slit into rectangular strips, each having predetermined width and length values, and then the slit strip is formed into a composite gasket material ring, nearly 100% of the effective area of the composite gasket material sheet can be slit into strips which are formed into the composite gasket material rings. The composite gasket material sheet can thus be utilized fully without causing waste. In other words, in accordance with the present invention, the composite gasket material sheet can be effectively utilized nearly 100%, thereby not wasting resources, resulting in reduction of production costs.

Moreover, in accordance with the present invention, since both longitudinal ends of the rectangular strip obtained by slitting the sheet of the composite gasket material having the reinforcing core material therein are joined to each other, and the strip is bent to form a pipe-shaped composite gasket material ring by butt-joining both fringes of the strip to each other, the composite gasket material ring has a spring characteristic offered by the repulsive elasticity of the reinforcing core material having been bent into a pipe ring shape, thereby improving the spring characteristic, that is, the restoring force of the metal seal ring.

In addition, the present invention is advantageous, compared to a conventional method wherein laminated ring plates are used to fill a one side opened metal ring, in that the closed pipe ring can be formed more accurately and uniformly in shape and dimensions and that it can be further formed more easily since the one side opened metal ring made of a metal sheet and having a J- or U-shaped cross section is filled with the composite material ring having a pipe-shaped or solid circular cross section, and then the leg portions opened and extended from the above metal ring are respectively bent to form the closed pipe ring.

BRIEF DESCRIPTION OF THE DRAWINGS

FIGS. 10(a) to 10(e) are views illustrating a conventional method of producing metal seal rings.

DETAILED DESCRIPTION OF THE PREFERRED EMBODIMENT

Figure 1:
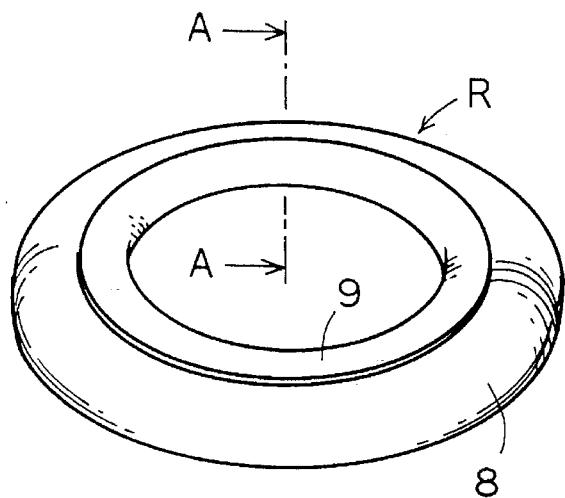
FIG. 1 is a perspective view showing a metal seal ring of the present invention.
Figure 2:
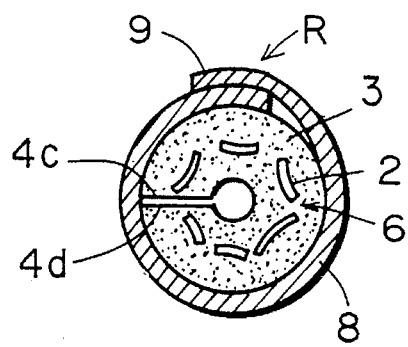
FIG. 2 is a sectional view taken on line A—A in FIG. 1.

In the following description, the same members as those of the prior art are designated by the same reference numerals.

A metal seal ring R of the present invention is made by filling the interior of a closed pipe ring 8 made of a thin metal sheet and having a pipe-shaped cross section with a composite gasket material ring 6 formed from a rectangular strip 4 (FIG. 3) of a composite gasket material 3 having a reinforcing core material 2.

Figure 3:
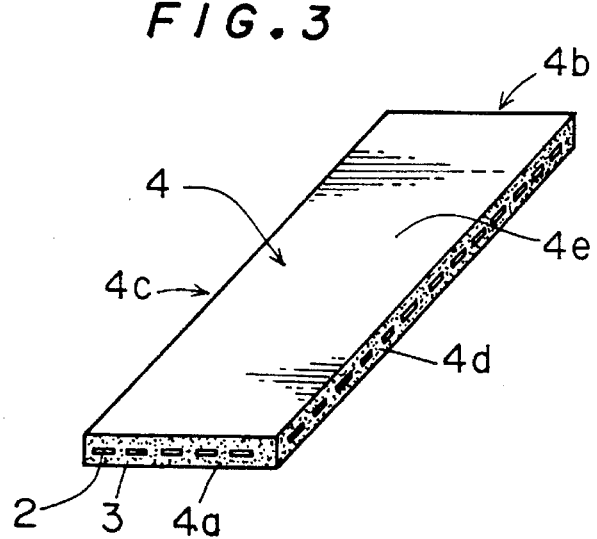
FIG. 3 is a perspective view showing a rectangular strip of a composite gasket material of the present invention.
Figure 4A:
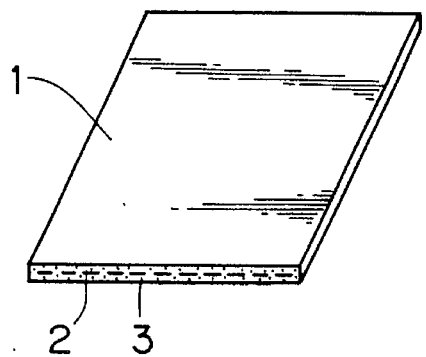
FIGS. 4(a) to 4(f) are views illustrating a method of producing a metal seal ring of the present invention.
Figure 4B:
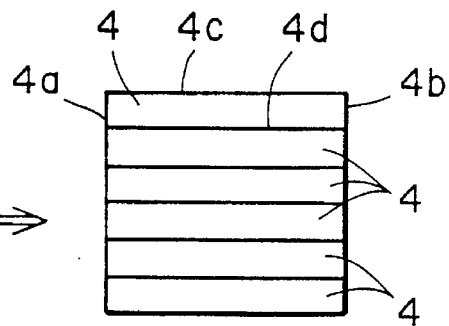

More particularly (a more detailed description regarding a method of production is given later), the rectangular strip 4 of the composite gasket material 3 shown in FIG. 3 is made by slitting a sheet 1 [FIG. 4(a)] of the composite gasket material 3 comprising a soft gasket material having heat resistance and elasticity, such as a mixture of heat-resistant fiber (aramid fiber, polyamide fiber, etc.) and elastomer, a graphite sheet, a ceramic sheet (comprising ceramic fiber, inorganic filler and organic binding agent) or a heat expansion ceramic sheet (comprising vermiculite, ceramic fiber and organic binding agent) laminated or coated on the reinforcing core material 2, such as a wire net, a thin metal sheet or a perforated steel plate, into strips having a rectangular shape [FIG. 4(b)].

Figure 4C:
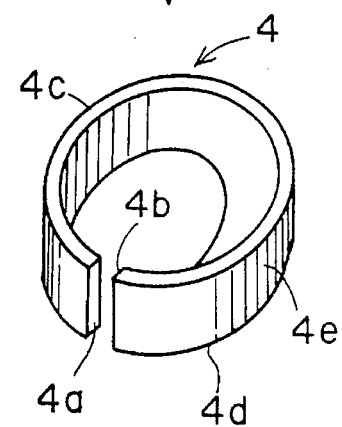
Figure 4D:
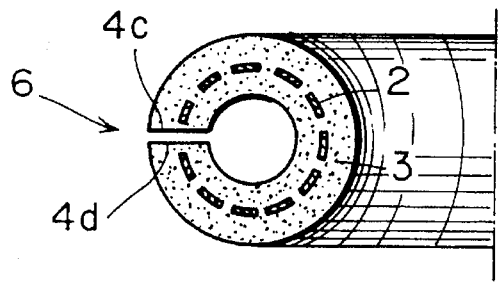

The rectangular strip 4 of the composite gasket material 3 is formed into a ring shape (FIG. 4(c)) by joining the longitudinal ends 4a and 4b thereof to each other and is formed further into a composite gasket material ring 6 [FIG. 4(d)] having a pipe-shaped cross section by bending the strip surface 4e so as to butt-join both fringes 4c, 4d of the strip 4 to each other. Alternatively, by compressing the composite gasket material ring 6 in the direction of its thickness, the strip 4 can also be formed into a composite gasket material ring 6 having a nearly solid circular cross section shown in FIG. 9.

Figure 4E:
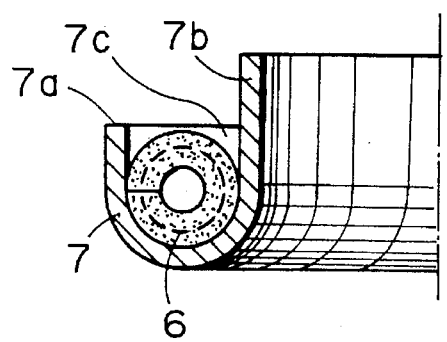
Figure 4F:
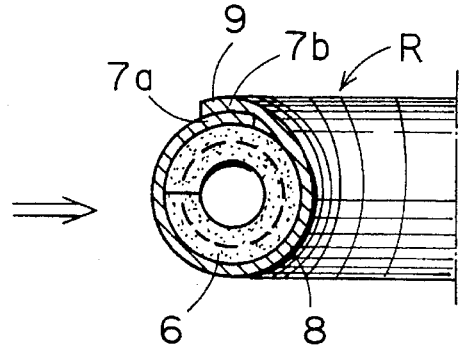

The above-mentioned composite gasket material ring 6 is filled [FIG. 4(e)] in a one-side opened metal ring 7 made of a thin elastic metal sheet (thickness: 0.2 to 0.3 mm for example), such as a stainless steel sheet, an inconel sheet, and having a nearly U- or J-shaped cross section and two leg portions 7a and 7b opened and extended nearly in parallel. The leg portions 7a and 7b of the one-side opened metal ring 7 are then bent and laminated around the composite gasket material ring 6 to form a closed pipe ring 8 having a pipe-shaped cross section [FIG. 4(f)]. Numeral 9 designates an overlap portion of the leg portions. The structure of the above-mentioned metal seal ring R of the present invention will be understood better by referring to the descriptions of the method of producing the metal seal ring of the present invention.

FIG. 4 shows the steps of producing the metal seal ring of the present invention. First, the sheet 1 of the composite gasket material 3 having the reinforcing core material 2 therein is prepared [FIG. 4(a)] and slit into rectangular strips [FIG. 4(b)], each having predetermined width and length values. FIG. 3 is a perspective view showing the strip 4 obtained by slitting. The above-mentioned predetermined length is a value which is appropriate to form a ring with a desired diameter when both longitudinal ends 4a and 4b of the strip 4 are joined to each other, and the predetermined width is a value which is appropriate to offer a desired cross section area to the composite gasket material ring 6. Accordingly, when the composite gasket material having the same volume (cross section area) as that obtained when the two ring plates 10 of the composite gasket material are laminated in the conventional production method shown in FIG. 10 is to be used, the strip 4 is slit such that its width is twice as large as that of a ring plate 10.

Figure 5:
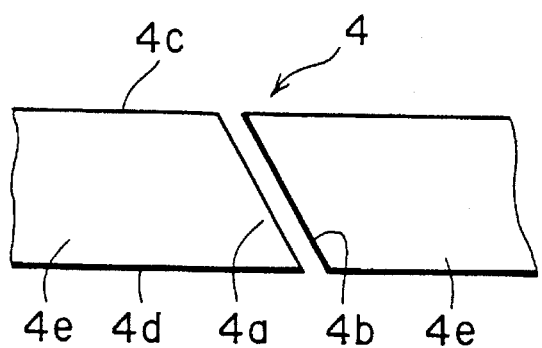
FIGS. 5, 6 and 7 are views showing other examples of joint portions at both longitudinal ends of the strip of the composite gasket material.
Figure 6:
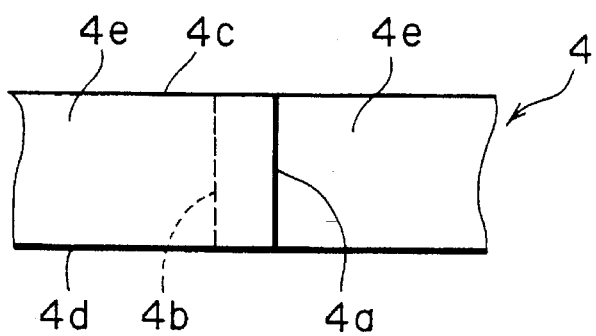
Figure 7:
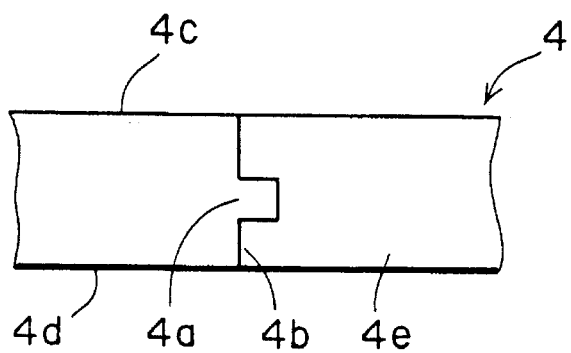

Both longitudinal ends 4a and 4b of the strip 4 are joined to each other so as to form the strip 4 into a ring shape [FIG. 4(c)]. Both ends 4a and 4b may be joined to each other by using an adhesive or they may be in a non-connecting condition, that is, just an abutting condition. Also, both ends 4a and 4b having a slant shape shown in FIG. 5 may be joined to each other, or, as shown in FIG. 6, both ends 4a and 4b may be joined to each other such that they overlap each other, or, as shown in FIG. 7, a convex portion disposed on the one end 4a may be fit in concave portion disposed on the other end 4b. Both ends 4a and 4b can thus be joined to each other in various ways.

Figure 9:
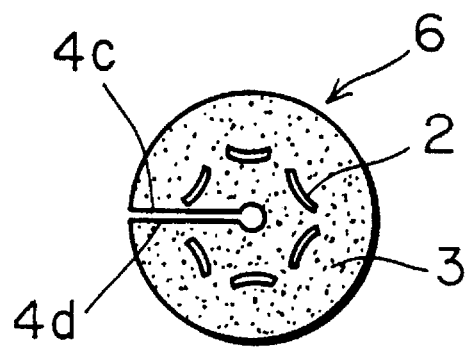
FIG. 9 is a horizontal sectional view of another embodiment of the composite gasket material ring.

Next, the surface 4e of the strip 4 having been formed into a ring by joining both longitudinal ends thereof to each other as described above is bent into a pipe shape by using a forming mold so as to butt-join fringes 4c, 4d to each other, thereby obtaining the composite gasket material ring 6 having a pipe-shaped cross section [FIG. 4(d)]. Otherwise, when or after the composite gasket material ring 6 is formed, the ring 6 is compressed in its thickness direction so that the ring 6 has a nearly solid circular cross section as shown in FIG. 9.

Figures 8A, 8B:
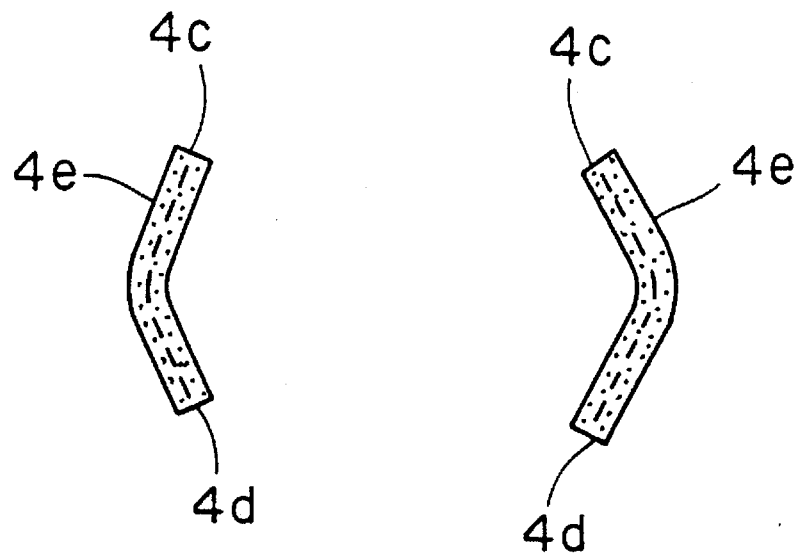
FIGS. 8(a) and 8(b) are horizontal sectional views illustrating a bending condition of the slit strip of the composite gasket material.

The surface 4e of the strip 4 obtained by slitting the composite gasket material sheet 1 usually tends to bend slightly as shown in FIGS. 8(a) and 8(b). This bending can be used advantageously when the strip 4 is formed into the ring having the pipe-shaped or solid circular cross section as described above. The composite gasket material ring 6 having been formed in this way has a spring characteristic offered by the repulsive elasticity of the reinforcing core material having been bent in a ring shape as described above.

Next, the composite gasket material ring 8 having been formed as described above is filled in a groove 7c between the leg portions 7a and 7b opened and extended nearly in parallel from the one-side opened metal ring 7 made of a thin elastic metal sheet, such as a stainless steel sheet or an inconel sheet, and having a nearly U- or J-shaped cross section [FIG. 4(e)]. The leg portions 7a and 7b of the one-side opened metal ring 7 are then bent around the composite gasket material ring so that the one-side opened metal ring 7 is formed into a closed pipe ring 8 having a pipe-shaped cross section [FIG. 4(f)], thereby completing the production of the metal seal ring R of the present invention.

In the above-mentioned description of the embodiment, when the rectangular composite gasket material strip 4 is formed into the composite gasket material ring, both ends 4a and 4b of the strip 4 are joined to each other to form a ring, and then the surface 4e of the strip 4 is bent by butt-joining the fringes 4c and 4d of the strip 4 to each other to form a pipe shape. Or otherwise, the above-mentioned sequential steps may be reversed, that is, the surface 4e may be bent first by butt-joining the fringes 4c and 4d of the strip 4 to each other. Furthermore, it is understood that further appropriate changes and modifications are possible without departing from the spirit of the present invention.

We claim:

1. A metal seal ring comprising:

a metal closed ring made of a metal plate, said metal closed ring being circular in cross section and hollow, and a ring of a composite gasket material having a reinforcing core material therein and filling said metal closed ring, and wherein said ring of said composite gasket material comprises a rectangular strip of said composite gasket material, said rectangular strip having longitudinal ends and fringes connecting said longitudinal ends, and said reinforcing core material is bent into a ring with the longitudinal ends of said bent rectangular strip joined to each other; and said bent rectangular strip is rolled into a cylindrical shape with both fringes of said bent rectangular strip butt-joined to each other.

2. A metal seal ring according to claim 1, wherein said strip of said composite gasket material comprises a mixture of heat-resistant fiber and elastomer laminated on both sides of said reinforcing core material.

3. A metal seal ting according to claim 1, wherein said composite gasket material strip comprises a graphite sheet laminated on both sides of said reinforcing core material.

4. A metal seal ring according to claim 1, wherein said composite gasket material strip comprises a ceramic sheet comprising ceramic fiber, inorganic filler and organic binding agent laminated on both sides of said reinforcing core material.

5. A metal seal ring according to claim 1, wherein said composite gasket material strip comprises a heat expansion ceramic sheet comprising vermiculite, ceramic fiber and organic binding agent laminated on both sides of said reinforcing core material.

6. A metal seal ring according to claim 1, wherein said reinforcing core material is selected from the group consisting of a thin metal sheet and a thin perforated metal plate.

* * * * *